US007260596B1

(12) United States Patent
Zhou

(10) Patent No.: US 7,260,596 B1
(45) Date of Patent: Aug. 21, 2007

(54) DISTRIBUTED SERVICE PROVIDER

(75) Inventor: Yiming Zhou, Union City, CA (US)

(73) Assignee: Sony United Kingdom Limited, Weybridge (GB)

( * ) Notice: Subject to any disclaimer, the term of this patent is extended or adjusted under 35 U.S.C. 154(b) by 312 days.

(21) Appl. No.: 09/656,969

(22) Filed: Sep. 7, 2000

(30) Foreign Application Priority Data

Sep. 8, 1999 (GB) ................................. 9921233.4

(51) Int. Cl.
*G06F 15/16* (2006.01)
(52) U.S. Cl. ...................... 709/200; 718/102; 718/104; 718/105; 709/229; 709/201; 709/203; 707/9
(58) Field of Classification Search ................. 705/51; 709/106, 229, 104, 225; 395/800; 712/30; 370/338; 710/6; 714/712; 713/201
See application file for complete search history.

(56) References Cited

U.S. PATENT DOCUMENTS

| 4,466,063 | A | * | 8/1984 | Segarra et al. ............... 709/226 |
| 4,969,146 | A | * | 11/1990 | Twitty et al. ................ 370/338 |
| 5,034,882 | A | * | 7/1991 | Eisenhard et al. ............ 712/30 |
| 5,151,990 | A | * | 9/1992 | Allen et al. .................. 711/170 |
| 5,555,376 | A | * | 9/1996 | Theimer et al. ............. 709/229 |
| 5,603,054 | A | * | 2/1997 | Theimer et al. ............... 710/6 |
| 5,619,657 | A | * | 4/1997 | Sudama et al. ............. 709/225 |
| 5,978,940 | A | * | 11/1999 | Newman et al. ............. 714/712 |
| 6,085,216 | A | * | 7/2000 | Huberman et al. ......... 709/104 |
| 6,250,557 | B1 | * | 6/2001 | Forslund et al. ............ 235/492 |
| 6,256,664 | B1 | * | 7/2001 | Donoho et al. ............. 709/204 |
| 6,279,112 | B1 | * | 8/2001 | O'Toole et al. ............... 726/10 |
| 6,356,929 | B1 | * | 3/2002 | Gall et al. ................... 709/201 |
| 6,408,336 | B1 | * | 6/2002 | Schneider et al. .......... 709/229 |

(Continued)

FOREIGN PATENT DOCUMENTS

WO 98/15903 4/1998

(Continued)

OTHER PUBLICATIONS

Sebes, E.J.; Vickers Benzel, T.C. "SIGMA: security for distributed object interoperability between trusted and untrusted systems." Dec. 9-13, 1996. Computer Security Applications Conference, 1996, 12th Annual. pp. 158-168.*

*Primary Examiner*—Bunjob Jaroenchonwanit
*Assistant Examiner*—A. Widhalm
(74) *Attorney, Agent, or Firm*—Oblon, Spivak, McClelland, Maier & Neustadt, P.C.

(57) ABSTRACT

A station for a network apparatus, which includes interconnected by a communication link, includes a network connection; a self assessment module operable to determine a current status of the station including a measure of the stations available resources; a trust list that includes a station identifier for each other station which is designated as trusted to perform tasks for the station; and a broadcast unit operable to transmit service requests to the network. The service requests are directed to each other station in the trust list and request each other station to perform a task. The station also includes an answer unit operable to receive service requests from the network and transmit an acceptance or refusal message in response to the service request. The acceptance or refusal is decided based on the current status of the station as determined by the self assessment module.

15 Claims, 3 Drawing Sheets

U.S. PATENT DOCUMENTS

| | | | |
|---|---|---|---|
| 6,463,457 B1 * | 10/2002 | Armentrout et al. | 709/201 |
| 6,466,978 B1 * | 10/2002 | Mukherjee et al. | 709/225 |
| 6,473,794 B1 * | 10/2002 | Guheen et al. | 709/223 |
| 6,532,368 B1 * | 3/2003 | Hild et al. | 455/515 |
| 6,598,067 B1 * | 7/2003 | Wydra et al. | 718/100 |
| 6,665,716 B1 * | 12/2003 | Hirata et al. | 709/224 |
| 6,757,903 B1 * | 6/2004 | Havemose | 719/319 |
| 7,162,525 B2 * | 1/2007 | Cofta et al. | 709/228 |
| 2003/0055890 A1 * | 3/2003 | Senda | 709/203 |

FOREIGN PATENT DOCUMENTS

| | | | |
|---|---|---|---|
| WO | WO98/15903 | * | 4/1998 |

* cited by examiner

DISTRIBUTED SERVICE PROVIDER

This application claims priority from UK patent application GB2354090 which is currently pending. Pending Japanese patent application JP2001147907 also claims priority form this UK patent application.

BACKGROUND OF THE INVENTION

1. Field of the Invention

The invention relates to a computer network comprising a plurality of interconnected stations, more especially to the distribution of tasks between stations of a network in order to improve performance of the stations as viewed as a whole.

2. Description of the Prior Art

In a computer network, each station, node or terminal will have its own tasks to perform. It is also the case that, in use, there will wide fluctuations in usage across the stations. Because of this, various schemes have been developed to increase the performance of a station by utilising spare capacity in other stations of the network that may otherwise lie idle. The present invention relates to one such scheme.

SUMMARY OF THE INVENTION

According to a first aspect of the invention there is provided a station for a network apparatus comprising the station and a plurality of other stations, all interconnected by a communication link, the station comprising:

a network connection;

a self assessment module operable to determine a current status of the station, wherein the current status is a measure of the stations available resources;

a trust list that includes a station identifier for the or each other station which is designated as trusted to perform tasks for the station;

a broadcast unit operable to transmit service requests to the network connection and onto the network, the service requests being directed to the or each other station identified in the trust list and constituting a request to the or each other station to perform a task for the station; and an answer unit operable to receive service requests from the network through the network connection and, in response thereto, to transmit to the network through the network connection an acceptance or refusal message in respect of the service request, the acceptance or refusal being decided having regard to the current status of the station, as determined by the self assessment module.

According to a second aspect of the invention there is provided a method of distributing tasks in a network comprising a plurality of stations, all interconnected by respective network connections to a communication link, the method comprising:

transmitting a service request by a first station to its network connection and onto the network, the service request being directed to a trusted sub-group of the stations and specifying a task to be performed; and receiving the service request by a second station, that is one of the trusted sub-group of stations, through its network connection and, in response thereto, transmitting to the network through its network connection an acceptance or refusal message in respect of the service request, the acceptance or refusal being decided having regard to the current status of the second station, as determined by a self assessment of the second station; and carrying out the task specified in the service request by the second station and returning a service result to the first station.

According to an embodiment of the invention there is provided a distributed artificial intelligence service provider (DAISP) for a station according to the first aspect of the invention. This will be beneficial for both broadcasters and service providers, since many if not most applications should be network based nowadays.

The basic idea of DAISP is to make use of all available computer power in a networked environment and not to affect local users' activities. Distribution should be done whenever and wherever needed in a straightforward, effective, and simple way.

The DAISP is a normal user level application. It does NOT require anything special from an existing operating system. In a Unix situation, it will run as long as the user has a valid account. In the Microsoft NT case, it will run on a normal NT workstation and it does not require special libraries apart from the Winsock.dll which is needed for networking under NT.

The DAISP architecture is not a client/server architecture. There is no central server for the service so that there is no single point failure in the system. It is a network where individuals serve others on a trust basis, and themselves if necessary. At some times, the stations work together to produce harmonious performance. Individuals use the network as a stage to play on, to serve others, and to communicate/monitoring. It is possible for a station not to provide any service to others. In this case, it is a customer/listener only station. However, such a station is still part of the architecture.

BRIEF DESCRIPTION OF THE DRAWINGS

The above and other objects, features and advantages of the invention will be apparent from the following detailed description of illustrative embodiments which is to be read in conjunction with the following drawings in which.

DESCRIPTION OF THE PREFERRED EMBODIMENTS

Figure 1:
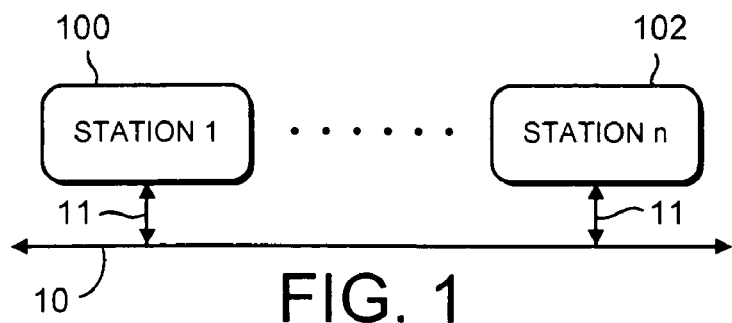
FIG. 1 shows a network in the form of a distributed system of interconnected stations.

FIG. 1 shows a computer network comprising a plurality of stations 100, 102 . . . etc. sequentially labelled 1, 2, . . . n. The stations are networked by a communication link 10 with spurs 11 interconnecting each station to the main network link 10.

Figure 2:
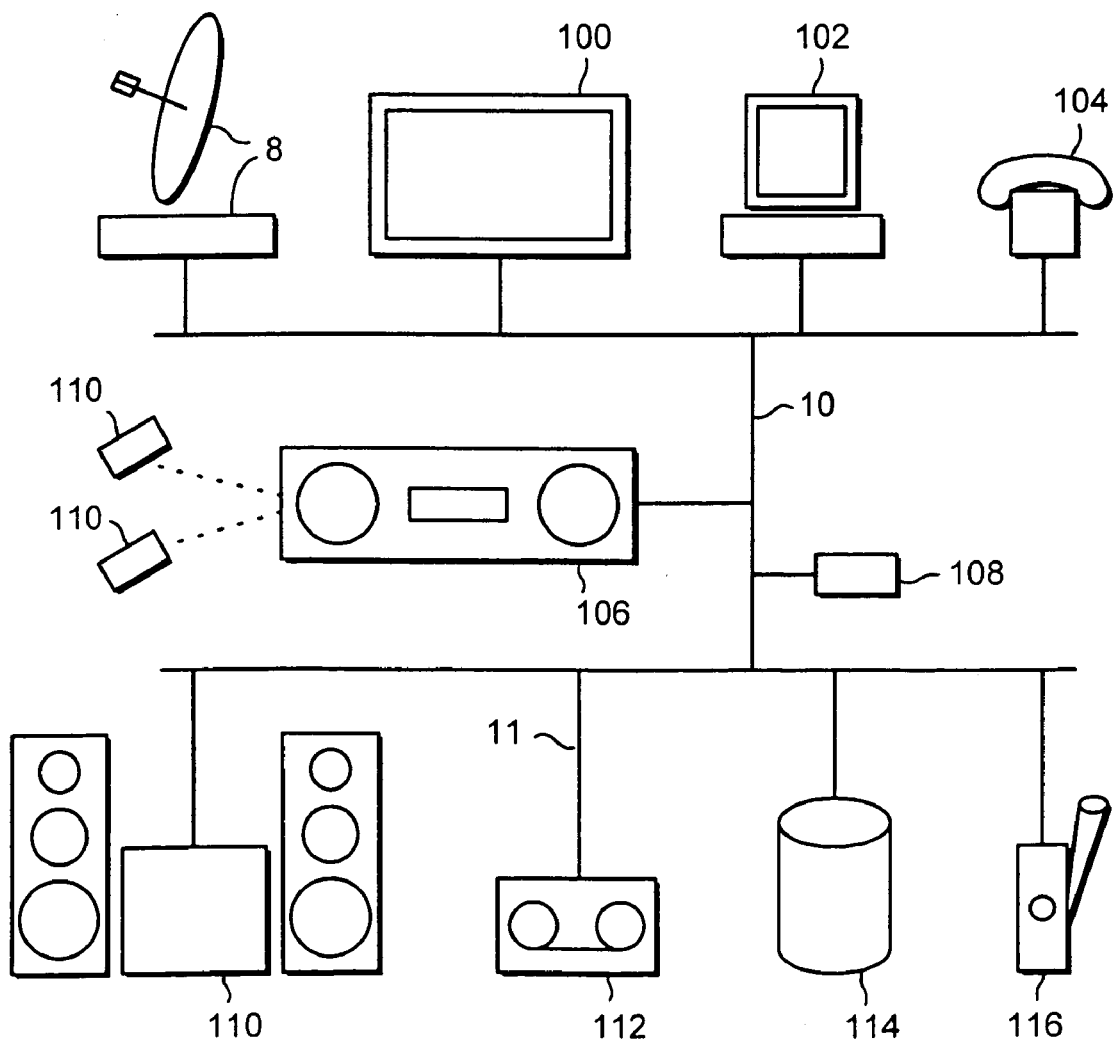
FIG. 2 shows a home network system example conforming to the network architecture of FIG. 1.

FIG. 2 is an example of the general network of FIG. 1 in the form of a home network comprising a number of disparate stations linked by a home network cable 10. The home network protocols and hardware comply to the standard IEEE 1394. The network is linked to the outside world by a satellite transceiver 8. The network stations shown by way of example are a television 100, a desk-top personal computer 102, a telephone apparatus 104, a set top box 106, a digital closed circuit television (CCTV) camera 108, a hi-fi system 110, a video recorder 112, a lap-top personal computer 114 and a digital video camera 116.

It is envisaged that a typical home network will have connected to it a disparate collection of stations, each having different computing capabilities. For example, it may be expected that the personal computers 102 and 114 will have relatively powerful general processing and memory capabilities, whereas the digital video camera 116 and television 100 may have relatively powerful image processing capabilities.

Moreover, it is envisaged that some of the stations will be transient elements in the system in that they will be plugged in and out as "plug-and-play" devices, i.e. devices that are automatically configurable in the network. For example, the lap-top computer 114, and the digital camera 116 will be connected to the home network only sporadically.

Figure 3:
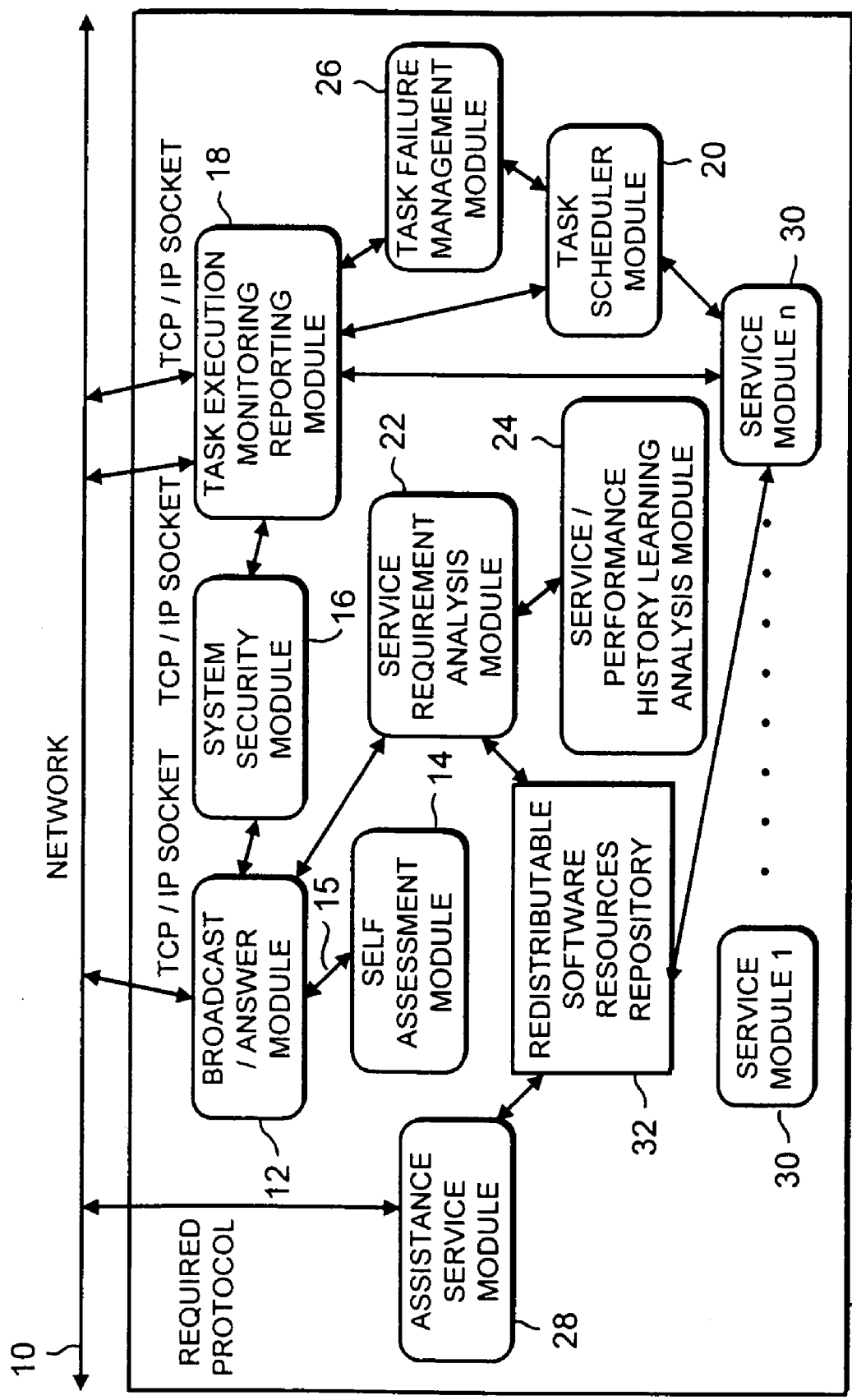
FIG. 3 shows internal modules of a station according to FIG. 1 or 2.

FIG. 3 shows internal structure of the station 100. The further stations 2, 3, 4, . . . n will have the same internal structure. The internal structure is made up of a number of interconnected components, each of which is described in turn below. The illustrated components of the station are a broadcast/answer module 12, a self assessment module 14, a system security module 16, a task execution, monitoring and reporting module 18, a task scheduler module 20, a service requirement analysis module 22, a service/performance history learning analysis module 24, a task failure management module 26, an assistance service module 28, a plurality of service modules 30, and a redistributable software resource repository 32.

Figure 4:
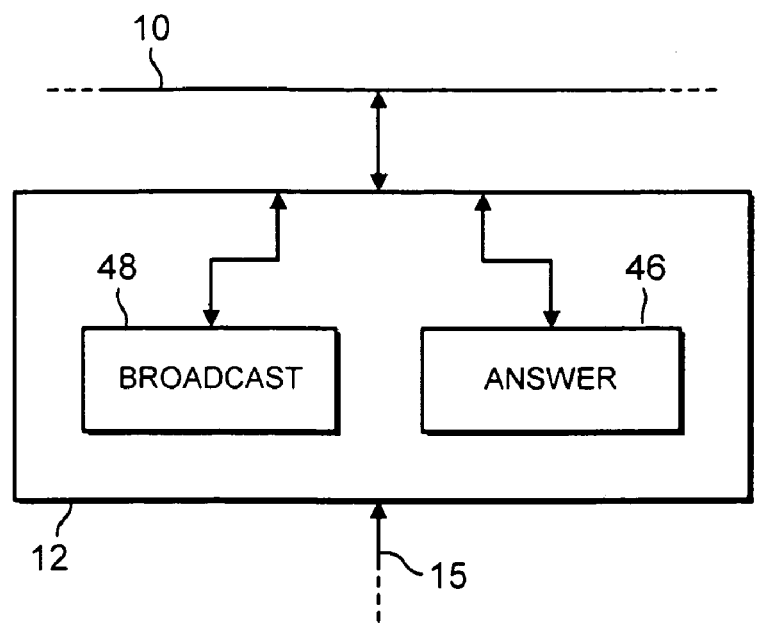
FIG. 4 is a block diagram of an embodiment of the broadcast/answer module.

The broadcast/answer module 12 is shown in its station environment in FIG. 3 and again in FIG. 4 which shows further internal structure of the broadcast/answer module 12.

The broadcast/answer module 12 is the module to broadcast service requirements to the network. The requirement can be anything related to the task it is performing. For example, if a station wants to take on a task since it is the most suitable station to do the job, but found that there was a software module missing in its library, it could then broadcast the requirement for the piece of software.

As shown in FIG. 4, the broadcast/answer module 12 has a broadcast unit 48 and an answering unit 46. The broadcast unit 48 is operable to transmit resource requests to the network. The answering unit 46 includes information about the station's self-assessment of its performance if it takes on the task and some basic station-based information such as CPU power, benchmark, free memory, total memory, current load of the machine, etc. Before answering any service requirements, security has to be checked to keep intruders away. Also, it has to check resources inside itself to make sure it can take on the task.

Figure 5:
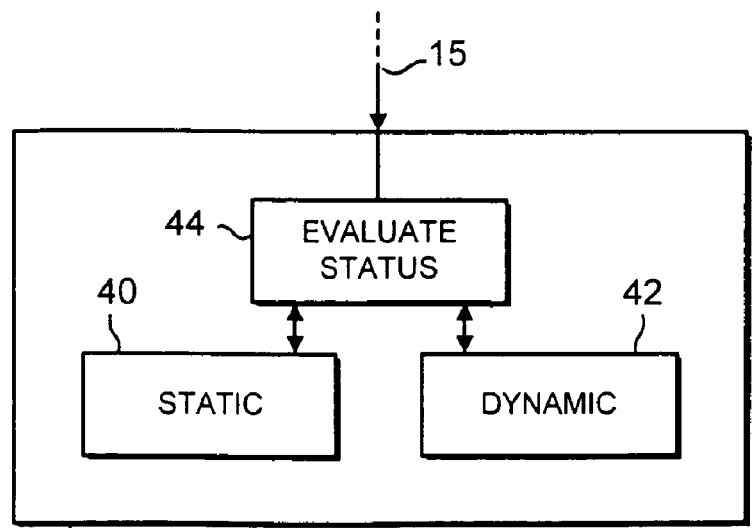
FIG. 5 is a block diagram of an embodiment of the self assessment module.

The self assessment module 14 is illustrated in FIG. 3 in its station environment, and again in FIG. 5 which shows internal structure of the self assessment module 14.

The self assessment module 14 provides two kinds of self assessment or self evaluation, namely self assessment based on static status and self assessment based on dynamic status. The status information is held in respective status units 40 and 42. The status is evaluated by a status evaluation unit 44. The self assessment module 14 is connected to the broadcast/answer module 12 by a link 15. In response to a status request from the broadcast/answer module 12, the station status is evaluated by the status evaluation unit 44 and a result returned by the link 15. The status request may be prompted, for example, by receipt of a request from a trusted remote station for resources.

The static status information is held in a static status unit 40 and includes:
(a) CPU model, number,
(b) Total memory,
(c) Total permanent storage,
(d) Byte Benchmark (Integer, memory, floating point),
(e) Operating System ID, version,
(f) Special hardware devices ID, version.

The dynamic status information is held in the dynamic status unit 42 and includes:
(a) CPU load (current, last 1 minute, last 5 minutes, last 15 minutes).
(b) Network bandwidth (Mbit/Sec).
(c) Number of native Processes.
(d) Status of native Processes (Owner, CPU, Disk, RAM and Special hardware usage).
(e) Number of alien Processes.
(f) Status of alien Processes (Owner, CPU, Disk, RAM and Special hardware usage).
(g) Free available disk space of those Disk IDs.
(h) Total free RAM.
(i) Special Hardware status.

Static status takes relatively long time to complete. It generally needs to be done only once when the DAISP is up and running first time after a hardware update. It is then saved as a file which can be used when needed. Dynamic status has very short life time, i.e. it is out of date soon after it is obtained. It will be obtained periodically and dispatched if needed immediately.

The system security module 16 guards a station running DAISP by every means. It can prevent answering malicious requirements and unreasonable task execution requirements. It can use encryption to protect the communication between stations. Normally, this is done on a trust basis, as defined by a trust list held in and for each station. The trust list is a list of the station identifiers of those other stations which are permitted to pool tasks with the station concerned. That is, the trust list is a list of other stations which the station concerned will transmit broadcast requests to and will be prepared to consider answering broadcast requests from.

In the example of the home system, there may be a number of personal computers used by different family members. Personal computers of children, for example, could be excluded from trust lists to reduce the virus hazard.

If a station is trusted in the DAISP, it will have the right to access whatever it can access under the operating system's discretion. For example, if a DAISP is run by a normal user (compared with privileged user), it will have access to the resources which a normal user can access.

In the case of a normal UNIX box, it will have access to the user's own quota controlled hard disk, user ID priority governed CPU usage, etc.

In a Microsoft NT environment, a normal user will have the right to access all shared hard disks on the network and user ID priority governed CPU usage. Care must be taken in the Microsoft case since a normal user has access to the network wide shared disks.

The task execution, monitoring, reporting module 18 takes on a task and starts execution if necessary. It will broadcast status to the network. The purpose of doing this is that if the station fails in the middle of the execution, others will know about the task and its progress and take over. For example, if station α started a service and put up a message onto the network saying that "I am doing the task, it should finish by 21:10:35 and this information is updated at 21:10:10, and next update will be at 21:10:20", if it fails to update the message at 21:10:21, everybody on the network knows that something unexpected happened to α, then the capable station at the time can take on the task and inform the network about its action. This will guarantee the quality of the service.

The task scheduler module 20 maintains a tasks' and stations' priority scheme which governs the task execution priority in the station. It will monitor all tasks in the station including local tasks, which are the tasks initiated locally and foreign tasks, which are created by remote DAISP users. For example, if a local user starts a task, say Microsoft word, the Task scheduler module has to act quickly to suspend some of the foreign tasks in order to release enough resources, say CPU power, back to the local resources pool. It will guarantee that the local user will not be affected by any foreign tasks running in the machine. That will encourage users to participate the DAISP scheme.

The service requirement analysis module 22 does extra work after finishing a service and provides information about performance and possible improvement. It maintains the redistributable software resource repository 32 inside of the station. For example, if a software module was not used for a long time, it can ask others to have it. If nobody wants it, it can put it into a software dump place. If it finds out there exists a new version of a software, it can update the software collection of the station by grabbing it through internet and let other station know it.

The service/performance history learning analysis module 24 is concerned with the history of the station. Its main task is to optimise the station so that it can service the network better. It will try to find bottlenecks for different tasks and will bring these to the attention of the system administrators if it can not solve it itself.

The task failure management module 26 deals with both failure of itself and other stations in the network. If it fails to do something, it will put a requirement up to the network for solution. If it found somebody else's failure such as mentioned in the "Task execution, monitoring, reporting module" section, it will see whether it can take on the task. If it can, it will broadcast the response and wait a while for answers. If nobody answers before timeout, it will start to continue the services.

The assistance service module 28 works as a bridge to other modules, for example, as a intermediate delivery station for a long distance material transfer. Or, it can be treated as sub-service to other service stations.

The service modules 30 are the modules that do the actual service jobs. they can be any services such as AI service for user habit catching, analysis and predicting, video streaming services, streaming convergence services, etc. Certain service modules can be inside of "Redistributable software resource repository". They could be relocated to somewhere else in order to serve customers better.

A Distributed AI Service Provider (DAISP) based on the above-described distributed system architecture and a Linux operating system has been designed and implemented. It can be put on to one bootable floppy disk for machines which have sufficient memory to operate it. It can do distributed AI servicing without waste of hardware resources. Learning and predicting requirements from clients can be dealt with seamlessly, i.e. the DAISP provides a Plug-and-Play type of service. Testing has been done by using multiple PCs, such as dual Pentium II 400 with 256 Mb RAM. The whole system functioned as expected and execution time for learning and predicting was nearly linearly reduced as more DAISPs were put into service.

The DAISP provides a good solution for many networked applications, for example as a host to an AI engine. The distributed system architecture can provide a more robust and reliable service in many areas.

Example Structure and Protocols

There follows a set of data defining structures and protocols of an exemplary embodiment of a distributed service provider:

```
/*  The ucLittleEndian must be set before a protocol can be sent.
    Do ucLittleEndian = LittleEndian;
    All command, apart from ALLDONE, start with either "SR" for
    Service Requirer to Service Provider "SP" for Service Provider to
    Service Requirer.
    When a protocol arrives its destination, it will be checked against
    its checksum
    Max number of protocols is 256.
*/
typedef enum
{
ALLDONE,            /*This one is sent by either sides and finish
                      the job for all.
                    */
SRNetBandwidth,     /*Command from a Service Requirer (SR) to
                      the DSP. Asking for permission to send test
                      block.
                      ulBlkLen = Length of the block
                    */
SPNetBandwidthACK,  /*DSP ack. the block has received and everything
                      the block.
                      ulBlkLen = Length of the block
                    */
SRSendProg,         /*Sending a program to a SP.
                      ulBlkLen = Length of the program
                      ucServiceID = Length of the filename
                      Program ID will be used as filename in the SP.
                      Care has to be taken that the SP saves the prog
                      as
                      /AllowedDIRbySP/ClientIP/ProgramName
                      where /AllowedDIRbySP MUST exist.
                      After the SP got and saved the program, the full
                      pathname of the program will be sent back for
                      the SR to run it later.
                    */
DataBlk,            /*sends any data block. SR<->SP
                      ulBlkLen = Length of the block
                    */
SRExecProg,         /*Send command to SP to run a program
                      delivered before.
                      ulBlkLen is the length of ExecCmdStruct (in
                      struct.h).
                      SP has to get the ExecCmdStruct block and
                      follow the instruction given there to run
                      the program.
                    */
SPExecProgACK,      /*Send ACK to SR,
                      The program has been executed, or not and
                      reason.
                      ulBlkLen = Prog's pid
                    */
SRStaticStatusReq,  /*Asking for the SP's static status.
                      SP has to create the structure and fill the
                      information required and using
                      SPStaticStatusAck to send the info back.
                    */
SPDiskParameters,   /*Send disk info. to SR.
                      ulBlkLen is the length of DiskInfo
                      (in struct.h) * the number of disks.
                    */
SPSepcialHWInfo,    /*Send special hardware information to SR.
                      ulBlkLen is the length of SpecialHWInfo
                      (in struct.h) * the number of SpecialHWInfo.
                    */
SPStaticStatusAck,  /*Ack of the SRStaticStatusReq.
                      ulBlkLen is the length of StaticStatusStruct
                      (in struct.h).
                      The structure will be sent after the protocol.
                    */
```

-continued

| | |
|---|---|
| SRDynamicStatusReq, | /*Asking for the SP's static status. SP has to create the structure and fill the information required and using SPDynamicStatusAck to send the info back. */ |
| SPProcessInfo, | /*Send the process info. if ucServiceID is set when receive the SRDynamicStatusReq. ulBlkLen is the length of ProcessInfo (in struct.h). The structure will be sent after the protocol. */ |
| SPDynamicStatusAck, | /*Ack of the SRDynamicStatusReq. ulBlkLen is the length of DynamicStatusStruct (in struct.h). The structure will be sent after the protocol. */ |
| SPIntermediateResult, | /*SP sends out intermediate result produced by executing a program back to the SR. ulBlkLen is the length of the result block. Result block has to be defined and understood by the SR and the program. */ |
| SPIntermediateStatus, | /*SP sends out intermediate result produced by executing a program back to the SR. ulBlkLen is the length of the status block. Status block has to be defined and understood by the SR and the program. */ |
| SPExecFinished, | /*SP sends out after an execution of a program finishs. ulBlkLen is the length of the result data block */ |
| SRSignalForExec, | /*SR sends a signal to the program executed in the SP. The signal has to be delivered to the program by kill(PID, signal). ucServiceID = the program ID. ulBlkLen = the signal. */ |
| SPSignalFromExec, | /*SP passes the signal produced by the program currently being executed to the SR. ucServiceID = the signal. */ |
| SRKillProg, | /*SR send the protocol to kill a program. ulBlkLen = the length of the program's name to be killed. a datablock of the program's name will follow. */ |
| SROSIDQuery, | /*SR asking SP's OSID. ucServiceID = SR's OSID. SP MUST send SPOSIDAck with ucServiceID as its OSID. This one is first sent by a SR to a SP after SP accepts its call. */ |
| SPOSIDAck, | /*SP Ack. SR's OSID query. ucServiceID = SR's OSID. This one is first sent by a SP to a SR after SP got SROSIDQuery. */ |
| SRRemoveProg, | /*SR wants to remove the old program in a SP. ulBlkLen = the length of the following Program Path. The program pathname will be sent using SendData. SP MUST get the program pathname using GetData then get rid of the program. */ |
| SPAskingAliveSR, | /*it is sent in the SP's monitoring session to see whether the concerned SR is still alive. (CtrlSkt) ulBlkLen = the pid of a program's issuer. */ |
| SRAckAlive, | /*Sent by the SR to ack. the SPAskingAliveSR, if ucService != 0, the issuer is still alive. */ |
| SPExecSktReady, | /*Sent by SP to inform SR that the socket for prog. exec. is ready. The SR can go ahead to connect to the data socket. ulBlkLen = the pid of the task. */ |
| SPExecFinish, | /*Sent by SP to inform SR that a task has been finished. ulBlkLen = the pid of the task. */ |
| SPAlive | /*Just inform the connected SR, SP is still alive. */} |

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Embodiments of the invention described above are implemented, at least in part, using software-controlled data processing apparatus, so it will be appreciated that a computer program providing such software control and a transmission or storage medium by which such a computer program is stored are envisaged as aspects of the present invention.

I claim:

1. A station for a network apparatus, said network apparatus comprising said station and a plurality of other stations, all interconnected in a network by a communication link, said station comprising:
   a network connection;
   a self assessment module operable to determine a current status of said station,
   wherein said current status is a measure of available hardware resources of said station, and
   wherein said current status includes a determination of a dynamic status for said station based on current usage of said hardware resources of said station;
   a trust list that includes a station identifier for each other station of said plurality of other stations which is designated as trusted to perform tasks for said station;
   a broadcast unit operable to transmit service requests to said network connection and via said network, said service requests being directed to said each other station identified in said trust list and constituting a request to said each other station to perform a task for said station;
   an answer unit operable to receive service requests via network through said network connection and, in response thereto, to transmit via network through said network connection an acceptance or refusal message in respect of said service request, said acceptance or refusal being decided based on said current status of said station, as determined by said self assessment module; and
   a service requirement analysis module and a software resource repository in which a plurality of software modules are stored, said service requirement analysis module being operable to maintain said software resource repository by importing and exporting software modules to and from other stations having regard to demand in said station for such software modules.

2. The station according to claim 1, wherein said self assessment module is operable to determine a static status for said station based on said hardware resources of said station.

3. The station according to claim 1, further comprising a system security module operable to handle encryption between said station and each other trusted station.

4. The station according to claim 1, further comprising a task execution, monitoring and reporting module operable to broadcast to said network progress updates on tasks accepted by and being performed in said station on behalf of an other station.

5. The station according to claim 1, further comprising a task scheduler module arranged to monitor all tasks being performed in said station, including tasks initiated by said station for said station and tasks being performed in response to receipt of a service request from one of said other stations.

6. The station according to claim 1, wherein said station is further operable to broadcast messages to said network offering software modules held in said software resource repository to each other trusted station.

7. The station according to claim 1, further comprising a service/performance history learning analysis module operable to apply artificial intelligence to find task bottlenecks in said station and said other station, and to bring these to the attention of a network administrator if it can not solve them itself.

8. The station according to claim 1, further comprising a task failure management module, operable to transmit to said network a failure message in response to failure of said station successfully to complete a task being performed for one of said other stations.

9. The station according to claim 8, wherein said task failure management module is further operable to monitor for failure messages transmitted by one of its trusted stations and, in response thereto, to handle said failure message as said service request message for said failed task.

10. A network comprising a plurality of stations according to claim 1 interconnected by a communication link.

11. A network according to claim 10, wherein there is no central server for said network.

12. A network according to claim 10, wherein said network operates to a protocol that permits stations to be removed from and added to said network dynamically.

13. A method of distributing tasks in a network comprising a plurality of stations, all interconnected by respective network connections to a communication link, said method comprising:
transmitting a service request by a first station to its network connection and via said network, said service request being directed to a trusted sub-group of said stations identified by a trust list and specifying a task to be performed for said first station; and
receiving said service request by a second station, that is one of said trusted sub-group of stations, through its network connection and, in response thereto, transmitting via said network through its network connection an acceptance or refusal message in respect of said service request, said acceptance or refusal being decided having regard to said current status of said second station, as determined by a self assessment of said second stations,
wherein said self assessment is operable to determine available hardware resources of said second station and a dynamic status for said second station based on current usage of hardware resources of said second station;
carrying out said task specified in said service request by said second station and returning a service result to said first station; and
maintaining a software resource repository by importing and exporting software modules to and from other stations having regard to demand in said second station for such software modules.

14. A method according to claim 13, wherein said carrying out of said service request by said second station involves further distribution of said service by transmitting further service requests to a sub-group of said stations trusted by said second station.

15. Computer program storage medium storing program instructions, which when executed on a computer, cause the computer to perform steps for carrying out a method according to claim 13.

* * * * *